US010460639B2

(12) United States Patent
Gu et al.

(10) Patent No.: US 10,460,639 B2
(45) Date of Patent: Oct. 29, 2019

(54) LUMINANCE COMPENSATION SYSTEM AND LUMINANCE COMPENSATION METHOD THEREOF

(71) Applicant: LG Display Co., Ltd., Seoul (KR)

(72) Inventors: Heon Gu, Paju-si (KR); Hyojung Park, Paju-si (KR); Junghoon Seo, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/052,202

(22) Filed: Aug. 1, 2018

(65) Prior Publication Data

US 2019/0066555 A1 Feb. 28, 2019

(30) Foreign Application Priority Data

Aug. 23, 2017 (KR) ........................ 10-2017-0106926

(51) Int. Cl.

*G06F 3/041* (2006.01)
*G09G 3/36* (2006.01)
*G09G 3/00* (2006.01)
*G09G 3/3225* (2016.01)

(52) U.S. Cl.

CPC ........... *G09G 3/006* (2013.01); *G09G 3/3225* (2013.01); *G09G 2300/043* (2013.01); *G09G 2310/027* (2013.01); *G09G 2310/08* (2013.01); *G09G 2320/0233* (2013.01); *G09G 2320/0271* (2013.01); *G09G 2320/0285* (2013.01);

(Continued)

(58) Field of Classification Search

CPC ................. G09G 3/006; G09G 3/3225; G09G 2300/043; G09G 2310/027; G09G 2310/08; G09G 2320/0233; G09G 2320/0271; G09G 2320/0285; G09G 2320/045; G09G 2360/145; G09G 2360/16

See application file for complete search history.

(56) References Cited

U.S. PATENT DOCUMENTS

2011/0205442 A1* 8/2011 Mori .................... G09G 3/3208 348/673
2018/0090075 A1* 3/2018 Garbacea ............. G09G 3/3291

FOREIGN PATENT DOCUMENTS

KR 10-2017-0023615 A 3/2017
KR 10-2017-0026974 A 3/2017

* cited by examiner

*Primary Examiner* — Nelson M Rosario
(74) *Attorney, Agent, or Firm* — Seed Intellectual Property Law Group LLP

(57) ABSTRACT

A luminance compensation system of a display device and a luminance compensation method thereof are disclosed. The luminance compensation system includes a display panel including a plurality of pixels, a TFT and an OLED, a luminance meter configured to measure luminance at a plurality of positions and obtain a plurality of measure values for each of the plurality of positions in a state where modeling voltage patterns are applied to the plurality of positions, a first modeling unit configured to model the plurality of measure values to derive a first luminance characteristic approximate equation, and a second modeling unit configured to obtain a luminance error between the measure value and a luminance value in accordance with the first luminance characteristic approximate equation, after calculating an offset correction parameter, and apply the offset correction parameter to the first luminance characteristic approximate equation to derive a second luminance characteristic approximate equation.

19 Claims, 12 Drawing Sheets

(52) U.S. Cl.
CPC . *G09G 2320/045* (2013.01); *G09G 2360/145* (2013.01); *G09G 2360/16* (2013.01)

Offset Correction Attenuation
Gain (D(v)) depending on Voltage

LUMINANCE COMPENSATION SYSTEM AND LUMINANCE COMPENSATION METHOD THEREOF

This application claims the priority to Republic of Korean Patent Application No. 10-2017-0106926 filed on Aug. 23, 2017 with the Korean Intellectual Property office, which is incorporated herein by reference in its entirety.

BACKGROUND

Technical Field

The present disclosure relates to a luminance compensation system of a display device and a luminance compensation method thereof.

Description of the Related Art

Various display devices have been developed and released. Among them, an electroluminescent display device is divided into an inorganic light emitting display device and an organic light emitting display device depending on a material of a light emitting layer. An active matrix organic light emitting display device includes organic light emitting diodes (OLEDs) capable of emitting light by themselves and has many advantages, such as a fast response speed, a high emission efficiency, a high luminance, a wide viewing angle, and the like.

The organic light emitting display device arranges pixels including each of the OLEDs in a matrix form and adjusts a luminance of the pixels based on a grayscale of image data. The pixels each include a driving thin film transistor (TFT) controlling a driving current flowing in the OLED based on a gate-to-source voltage of the driving TFT, and at least one switching TFT programming the gate-to-source voltage of the driving TFT. The pixels each adjust the display grayscale (luminance) by an amount of emitted light of the OLED which is proportional to the driving current.

In order to achieve a uniform image quality without luminance and color difference between the pixels, driving characteristics of the pixel such as a threshold voltage (Vth) of the driving TFT must be the same in all the pixels. However, there may be deviations in the driving characteristics between the pixels due to various causes including process deviations. If the driving characteristics are different between the pixels, an amount of driving current flowing to the OLED varies, which results in non-uniformity in image quality. In order to solve this problem, there is known a so-called external compensation technique of sensing the threshold voltage of the driving TFT from each pixel and correcting digital image data based on the sensed result.

The external compensation technique utilizes a sensing circuit for sensing the threshold voltage of the driving TFT. The sensing circuit is mounted on a source driver. The source driver supplies data voltage to the pixels through data lines, and is connected to the pixels through sensing lines to sense the threshold voltage of the driving TFT. Since the sensing circuit includes a plurality of sensing units and a plurality of analog-to-digital converters (ADC) for individually sensing each of the pixels, its size is large.

In addition, the conventional external compensation technique detects a deviation of the threshold voltage of the driving TFT which cannot be detected through the sensing circuit by using a camera and provides a method of reflecting the deviation on the data voltage. However, such a conventional luminance compensation system has a limitation in improving luminance compensation performance due to the following problems.

First, a display panel in which an initial driving TFT deviation is not corrected deviates from a dynamic range that can be photographed by a camera because a difference in luminance on an entire surface is too great.

Second, since the conventional luminance compensation system also performs detection operation through the sensing circuit and detection operation using the camera, time required for compensation is long.

Third, since the conventional luminance compensation system reflects a compensation value for increasing luminance uniformity of low grayscale on entire grayscale, the luminance uniformity deteriorates due to an adverse effect at high grayscale.

BRIEF SUMMARY

Accordingly, in some embodiments, the present disclosure provides a luminance compensation system of a display device and a luminance compensation method thereof that can reduce a time required for compensation by compensating a threshold voltage deviation of a driving TFT between pixels based on only a camera, and enhance luminance uniformity at low grayscale.

In some embodiments, the present disclosure provides a luminance compensation system of a display device and a luminance compensation method thereof that can prevent lowering of luminance uniformity of high grayscale while improving luminance uniformity of low grayscale.

In some embodiments, the present disclosure provides a luminance compensation system of a display device and a luminance compensation method thereof that can enable voltage-luminance modeling of a display panel having an initial luminance deviation exceeding a camera dynamic range In an embodiment, there is provided a luminance compensation system of a display device including a display panel including a plurality of pixels, each of the plurality of pixels including a driving thin film transistor (TFT) configured to generate a driving current based on a gate-source voltage and an organic light emitting diode (OLED) configured to emit light based on the driving current, a luminance meter configured to measure luminance of the display panel at a plurality of positions while a plurality of modeling voltage patterns are applied to the display panel, and obtain, for each of the plurality of positions, a plurality of measured values. A first modeling circuit is configured to model the plurality of measured values and to derive a first luminance characteristic approximate equation including at least one compensation parameter for an entire grayscale for each of the plurality of positions. A second modeling circuit is configured to: determine a luminance error between the measured values and approximate luminance values of the first luminance characteristic approximate equation at low grayscale sampling voltages of a low grayscale section, calculate an offset correction parameter by multiplying the determined luminance error by a low grayscale correction gain, and apply the offset correction parameter to the first luminance characteristic approximate equation to derive a second luminance characteristic approximate equation in which a low grayscale offset is corrected.

The luminance compensation system may further include a third modeling circuit configured to set an offset correction attenuation gain for reducing an influence of the offset correction parameter in remaining grayscale sections other than the low grayscale section, and to multiply the offset correction attenuation gain by the offset correction parameter of the second luminance characteristic approximate equation to derive a third luminance characteristic approximate equation.

The offset correction attenuation gain may be maintained at a value of "1" in the low grayscale section and may be proportionally reduced from "1" to "0" for grayscales in the remaining grayscale sections other than the low grayscale section.

The luminance compensation system may further include a memory configured to store the at least one compensation parameter, the offset correction parameter, and the offset correction attenuation gain.

The luminance compensation system may further include a compensation circuit configured to compensate the gate-source voltage of the driving TFTs in an entire grayscale section for each of the plurality of positions, the compensated gate-source voltage of the driving TFTs being equal to:

$$v_{gs}=\{V_{data}\times(a_{ref}/a_i)^{1/c_i}+b_i+D(V_{data})\Delta b_i(V_{data})\}-V_{ref}.$$

The Vdata denotes a data voltage of a digital level, the Vref denotes a reference voltage of a digital level, the ai, bi, and ci denote the compensation parameters at position i, the aref denotes an average value of a compensation parameter a at a plurality of positions, the D(Vdata) denotes the offset correction attenuation gain corresponding to the Vdata, and the Δbi(Vdata) denotes the offset correction parameter corresponding to the Vdata at position i.

The modeling voltage patterns may have different values at the plurality of positions so that an initial luminance deviation is minimized.

The second modeling circuit may be configured to estimate the offset correction parameter by interpolation at remaining voltages of the low grayscale section excluding the low grayscale sampling voltages.

In another embodiment, there is provided a luminance compensation method of a display device including a display panel including a plurality of pixels, each of the plurality of pixels including a driving thin film transistor (TFT) configured to generate a driving current based on a gate-source voltage and an organic light emitting diode (OLED) configured to emit light based on the driving current, the method including: applying a plurality of modeling voltages patterns to the display panel; measuring luminance of the display panel at a plurality of positions while the plurality of modeling voltages patterns are applied, and obtaining a plurality of measured values for each of the plurality of positions; determining a first luminance characteristic approximate equation for an entire grayscale for each of the plurality of positions based on the plurality of measured values for each of the plurality of positions, the first luminance characteristic approximate equation including at least one compensation parameter; determining a luminance error between the measured values and approximate luminance values of the first luminance characteristic approximate equation at low grayscale sampling voltages of a low grayscale section; calculating an offset correction parameter by multiplying the determined luminance error by a low grayscale correction gain; and applying the offset correction parameter to the first luminance characteristic approximate equation and determining a second luminance characteristic approximate equation in which a low grayscale offset is corrected.

In another embodiment, the present disclosure provides a luminance compensation system that includes a luminance meter which, in use, measures a plurality of luminance values at a plurality of positions of a display panel while a plurality of modeling voltage patterns are to the display panel. A first modeling circuit, in use, determines a plurality of compensation parameters of a first luminance characteristic approximate equation based on the plurality of measured luminance values. A second modeling circuit, in use: determines a luminance error between the measured luminance values and approximate luminance values of the first luminance characteristic approximate equation at low grayscale sampling voltages of a low grayscale section, the low grayscale sampling voltages corresponding to grayscale sampling voltages between zero and a first grayscale threshold voltage; calculates an offset correction parameter by multiplying the determined luminance error by a low grayscale correction gain; and applies the offset correction parameter to the first luminance characteristic approximate equation to correct a low grayscale offset.

BRIEF DESCRIPTION OF THE SEVERAL VIEWS OF THE DRAWINGS

The accompanying drawings, which are included to provide a further understanding of the present disclosure and are incorporated in and constitute a part of this specification, illustrate embodiments of the present disclosure and together with the description serve to explain the principles of the present disclosure. In the drawings.

DETAILED DESCRIPTION

Figure 1:
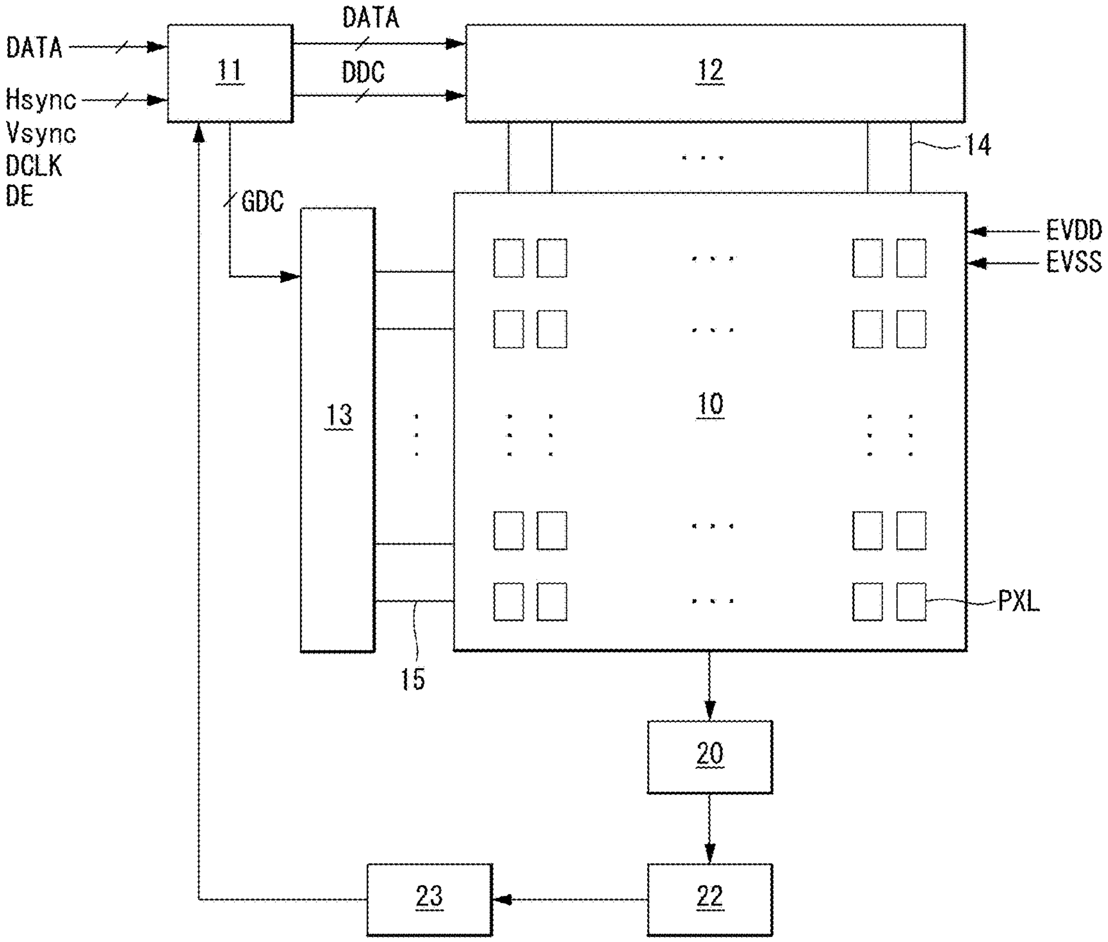
FIG. 1 is a block diagram illustrating a luminance compensation system of a display device according to an embodiment of the present disclosure.

Advantages and features of the present disclosure and methods for accomplishing the same will become apparent with reference to embodiments described in detail below with reference to the accompanying drawings. However, the present disclosure is not limited to the embodiments disclosed below, and may be implemented in various forms. These embodiments are provided so that the present disclosure will be exhaustively and completely described, and will fully convey the scope of the present disclosure to those skilled in the art to which the present disclosure pertains. The present disclosure is defined by the scope of the claims.

Shapes, sizes, ratios, angles, numbers, and the like illustrated in the drawings for describing embodiments of the present disclosure are merely exemplary, and the present disclosure is not limited thereto. Like reference numerals designate like elements throughout the description. In the following description, when a detailed description of well-known functions or configurations related to this document is determined to unnecessarily cloud a gist of the present disclosure, the detailed description thereof will be omitted. In the present disclosure, when the terms "include", "have", "comprised of", etc., are used, other components may be added unless an explicitly limiting term such as "~only" is used. A singular expression can include a plural expression as long as it does not have an apparently different meaning in context.

In the explanation of components, even if there is no separate description, it is interpreted as including an error range.

In the description of position relationship, when a structure is described as being positioned "on or above", "under or below", "next to" another structure, this description should be construed as including a case in which the structures contact each other as well as a case in which a third structure is disposed therebetween.

The terms "first", "second", etc., may be used to describe various components, but the components are not limited by such terms. These terms are only used to distinguish one component from another component. For example, a first component may be designated as a second component without departing from the scope of the present disclosure.

Like reference numerals designate like elements throughout the description.

The features of various embodiments of the present disclosure can be partially combined or entirely combined with each other, and is technically capable of various interlocking and driving. The embodiments can be independently implemented, or can be implemented in conjunction with each other.

Hereinafter, various embodiments of the present disclosure will be described in detail with reference to the accompanying drawings. The component names used in the following description are selected in consideration of ease of description and understanding in this specification, and may be different from the parts names of actual products.

Figure 2:
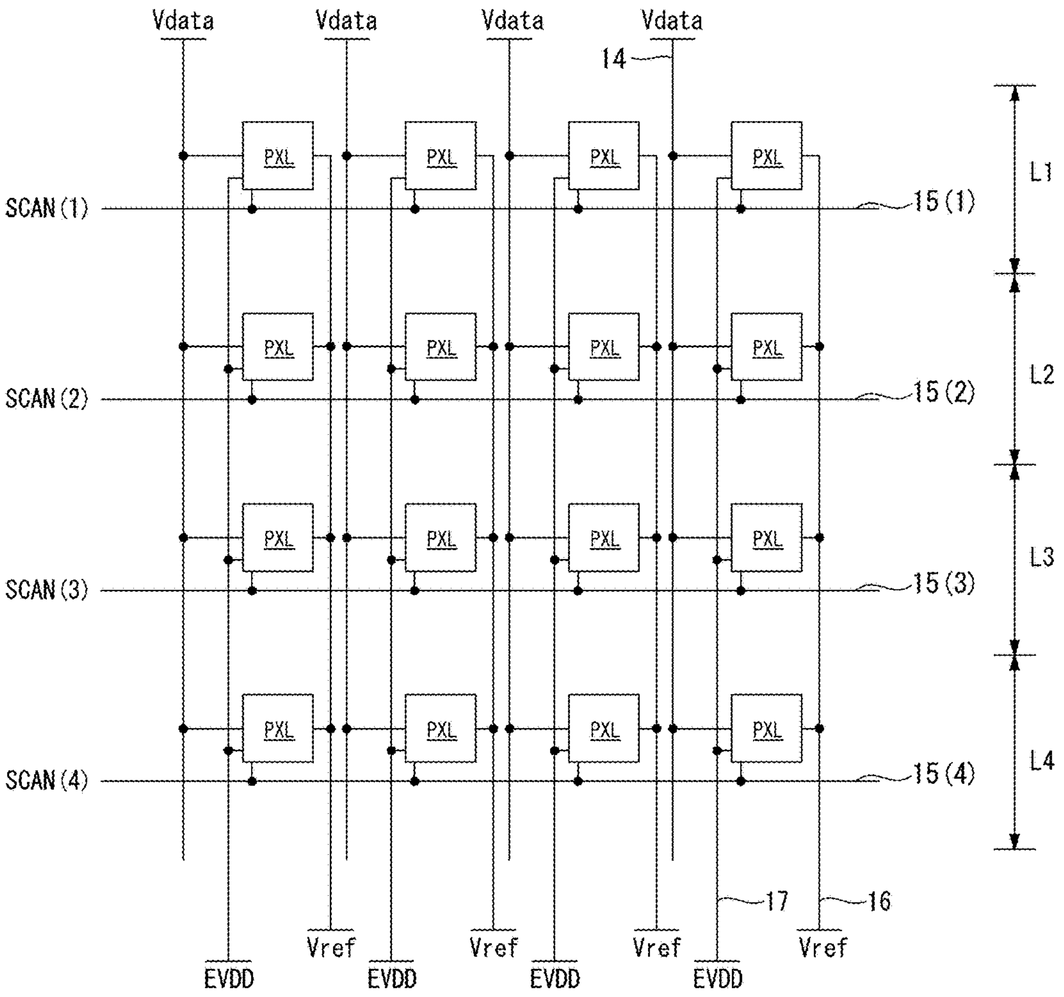
FIG. 2 is a diagram illustrating a pixel array of an organic light emitting display device according to an embodiment of the present disclosure.
Figure 3:
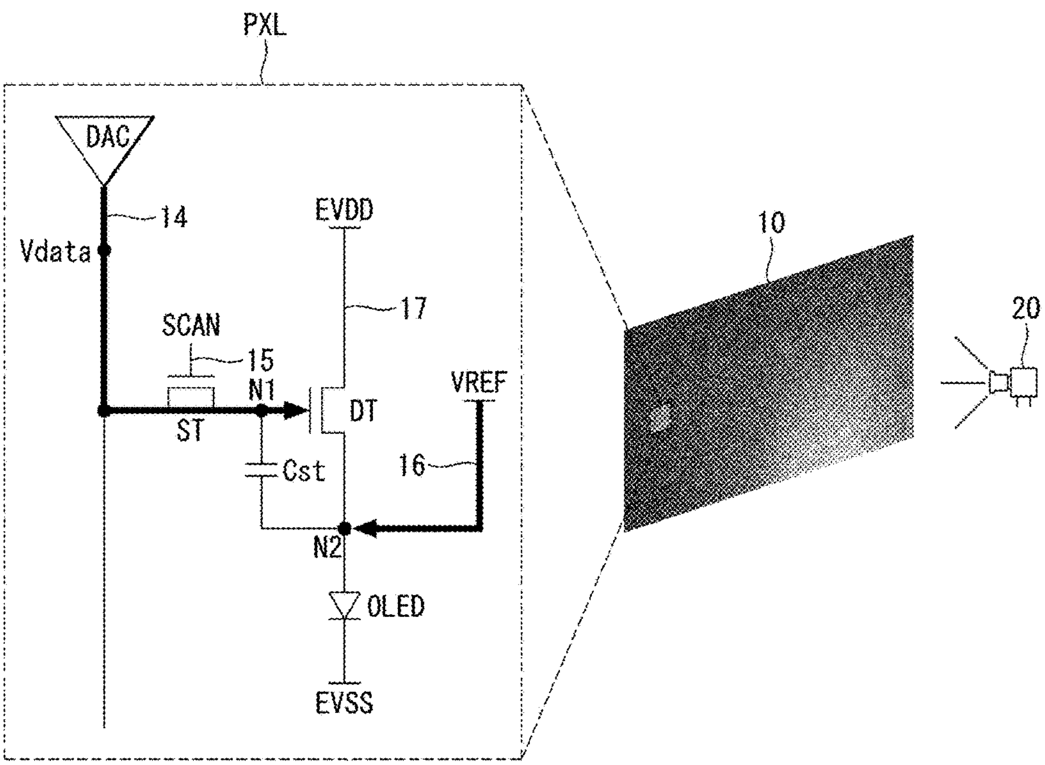
FIG. 3 is a diagram illustrating a pixel circuit of an organic light emitting display device according to an embodiment of the present disclosure.

FIG. 1 is a block diagram illustrating a luminance compensation system of a display device according to an embodiment of the present disclosure. FIG. 2 is a diagram illustrating a pixel array of an organic light emitting display device according to an embodiment of the present disclosure. FIG. 3 is a diagram illustrating a pixel circuit of an organic light emitting display device according to an embodiment of the present disclosure.

A luminance compensation system of a display device according to an embodiment of the present disclosure is based on an electroluminescent display device. The electroluminescent display device includes an inorganic light emitting display device and an organic light emitting display device. In an embodiment of the present disclosure, the organic light emitting display device is mainly described. The technical idea of the present disclosure may be applied not only to the organic light emitting display device but also the inorganic light emitting display device in accordance with various embodiments of the present disclosure.

Referring to FIG. 1, a luminance compensation system of a display device according an embodiment of the present disclosure includes a display panel 10 having a plurality of pixels PXL, panel driving circuits 12 and 13, driving signal lines connected to the pixels PXL, and a timing controller 11 controlling the panel driving circuits 12 and 13.

In the display panel 10, a plurality of data lines 14 and a plurality of gate lines 15 cross each other, and the pixels PXL are arranged in a matrix form to constitute a pixel array as shown in FIG. 2.

Referring to FIG. 2, the pixel array includes a plurality of horizontal pixel lines L1 to L4. On each of the horizontal pixel lines L1 to L4, a plurality of pixels PXL which are horizontally adjacent and connected in common to each of the gate lines 15(1) to 15(4) are arranged. Here, each of the horizontal pixel lines L1 to L4 is not a physical signal line, but a pixel block of one line, which is implemented by horizontally neighboring pixels PXL. Although only four horizontal pixel lines L1 to L4 and four gate lines 15(1) to 15(4) are shown in FIG. 2, it should be readily appreciated that any number of pixel lines L1 to Ln may be included in the pixel array in accordance with embodiments provided herein, and each of the pixel lines L1 to Ln may have a corresponding gate line 15(1) to 15(*n*). The pixel array may include first power supply lines 17 for supplying a high level power supply voltage EVDD to the pixels PXL, and second power supply lines 16 for supplying a reference voltage Vref to the pixels PXL. In addition, the pixels PXL may be connected to a low level power supply voltage EVSS.

Each of the pixels PXL, as shown in FIG. 3, includes an organic light emitting diode OLED, a driving TFT DT, a switching TFT ST, and a storage capacitor Cst.

Referring to FIG. 3, the organic light emitting diode OLED is a self emitting element that emits light depending on a driving current. The organic light emitting diode OLED includes an anode electrode connected to a source electrode of the driving TFT DT, a cathode electrode connected to the low level power supply voltage EVSS, and an organic compound layer provided between the anode electrode and the cathode electrode. The organic compound layer includes a hole injection layer HIL, a hole transport layer HTL, an emission layer EML, an electron transport layer ETL, and an electron injection layer EIL. When a power supply voltage is applied to the anode electrode and the cathode electrode, holes passing through the hole transport layer HTL and electrons passing through the electron transport layer ETL move to the emission layer EML and form excitons. As a result, the emission layer EML generates visible light.

Referring to FIG. 3, the driving TFT DT is a driving element for adjusting a driving current depending on a gate-source voltage Vgs. A gate electrode of the driving TFT DT is connected to a first node N1, and a source electrode of the driving TFT DT is connected to a second node N2. The reference voltage Vref is applied to the source electrode of the driving TFT DT through the second power supply line 16. The high level power supply voltage EVDD is applied to a drain electrode of the driving TFT DT through the first power supply line 17.

Referring to FIG. 3, the switching TFT ST is turned on/off depending on a gate signal SCAN to control a current flowing between the data line 14 and the first node N1. The switching TFT ST is turned on depending on the gate signal SCAN to apply a data voltage Vdata to the gate electrode of the driving TFT DT. The switching TFT ST includes a gate electrode connected to the gate line 15, a drain electrode connected to the data line 14, and a source electrode connected to the first node N1.

Referring to FIG. 3, the storage capacitor Cst is connected between the first node N1 and the second node N2 to maintain the gate-source voltage Vgs of the driving TFT DT for a predetermined time.

Each of these pixels PXL may be any one of a red pixel, a green pixel, a blue pixel, and a white pixel for various color implementations. The red pixel, the green pixel, the blue pixel, and the white pixel can constitute one unit pixel. For example, each of the red pixel, green pixel, blue pixel, and white pixel may be considered as sub-pixels, which together form one unit pixel. The color implemented in the unit pixel can be determined depending on an emission ratio of the red pixel, the green pixel, the blue pixel, and the white pixel.

Referring to FIG. 1, the panel driving circuits 12 and 13 write data DATA of an input image to the pixels PXL of the display panel 10. The panel driving circuits 12 and 13 include a source driver 12 driving the data lines 14 connected to the pixels PXL and a gate driver 13 driving the gate lines 15 connected to the pixels PXL.

Referring to FIG. 1, the source driver 12 converts the data DATA of the input image received from the timing controller 11 every frame into an analog data voltage Vdata, and supplies the data voltage Vdata to the data lines 14. The source driver 12 outputs the analog data voltage Vdata using a digital to analog converter (hereinafter, referred to as DAC) that converts the data DATA of the input image into a gamma compensation voltage.

The source driver 12 does not require a sensing circuit for sensing a threshold voltage of the driving TFT DT for each of the pixels. Since the source driver 12 does not include a plurality of sensing units for individually sensing each of the pixels and a plurality of analog-to-digital converters (ADC), a circuit size of the source driver 12 is smaller than when a separate sensing circuit is mounted, and a manufacturing cost of the source driver 12 is low.

A multiplexer (not shown) may be further disposed between the source driver 12 and the data lines 14 of the display panel 10. The multiplexer can reduce the number of output channels of the source driver 12 compared to the number of data lines by distributing the data voltages output through one output channel in the source driver 12 to the plurality of data lines. The multiplexer can be omitted depending on resolution and uses of the display device.

Referring to FIG. 1, the gate driver 13 supplies the gate signal SCAN to the gate lines 15 in a line sequential manner to select the horizontal pixel lines L1 to Ln to which the data voltage Vdata is charged under control of the timing controller 11. The gate driver 13 may be formed directly on a substrate of the display panel 10 together with the pixel array in a gate-driver in panel (GIP) process, but is not limited thereto. The gate driver 13 may be manufactured in an IC type and then bonded to the display panel 10 through a conductive film.

Referring to FIG. 1, The timing controller 11 receives the digital data DATA of the input image from a host (not shown) and timing signals synchronized with the digital data DATA. The timing signals may include a vertical synchronization signal Vsync, a horizontal synchronization signal Hsync, a dot clock signal DCLK, and a data enable signal DE. The host may be any one of a television (TV) system, a set-top box, a navigation system, a DVD player, a Blu-ray player, a personal computer (PC), a home theater system, and a phone system.

The timing controller 11 multiplies an input frame frequency by an integer value, i, and can control operation timings of the panel driving circuits 12 and 13 at a frame frequency of the input frame frequency×i (where i is a positive integer larger than 0) Hz. The input frame frequency is 60 Hz in the National Television Standards Committee (NTSC) system and 50 Hz in the Phase-Alternating Line (PAL) system.

The timing controller 11 generates a data timing control signal DDC for controlling the operation timing of the source driver 12 and a gate timing control signal GDC for controlling the operation timing of the gate driver 13 based on the timing signals Vsync, Hsync, and DE received from the host.

The data timing control signal DDC includes a source start pulse, a source sampling clock, and a source output enable signal. The source start pulse controls a sampling start timing of the source driver 12. The source sampling clock is a clock for shifting a data sampling timing. When a signal transfer interface between the timing controller 11 and the source driver 12 is a mini Low Voltage Differential Signaling (LVDS) interface, the source start pulse and the source sampling clock may be omitted.

The gate timing control signal GDC includes a gate start pulse, a gate shift clock, a gate output enable signal, etc. In an instance of the GIP circuit, the gate output enable signal may be omitted. The gate start pulse is generated at a beginning of the frame period every frame period and input to a shift register of each gate driver 13. The gate start pulse controls a start timing at which the gate signal SCAN is output every frame period. The gate shift clock is input to the shift register of the gate driver 13 to control a shift timing of the shift register.

In addition, a luminance compensation system of a display device according to an embodiment of the present disclosure includes a luminance meter 20, a luminance-voltage modeling circuit 22, and a memory 23 for compensating a threshold voltage deviation of the driving TFT DT between the pixels PXL without a separate sensing circuit.

Referring to FIG. 1, the luminance meter 20 measures luminance of an entire surface of the display panel 10 while the OLED of the pixels PXL emits light. The luminance meter 20 may be implemented as a camera or a surface meter or any device suitable to measure luminance over the entire surface of the display panel 10.

Referring to FIG. 1, the luminance-voltage modeling circuit 22 analyzes and models a relationship between the data voltage of the driving TFT DT provided in the pixels PXL and the luminance of light emission. The luminance-voltage modeling circuit 22 analyzes an error of a low grayscale modeling using an actual light emission distribution in a low grayscale section to improve luminance uniformity of low grayscale. Then, the luminance-voltage modeling circuit 22 can prevent lowering of luminance uniformity of high grayscale while improving the luminance uniformity of the low grayscale using an offset correction attenuation gain. In addition, the luminance-voltage modeling circuit 22 may design modeling voltage patterns to have different values at a plurality of positions so that an initial luminance deviation is minimized to enable voltage-luminance modeling of the display panel having the initial luminance deviation exceeding dynamic range of a camera.

The memory 23 stores compensation parameters calculated by the luminance-voltage modeling circuit 22. The memory 23 may be implemented as a nonvolatile memory in which the stored contents are maintained even when a system power is turned off. For example, the memory 23 may be a flash memory.

Figure 4:
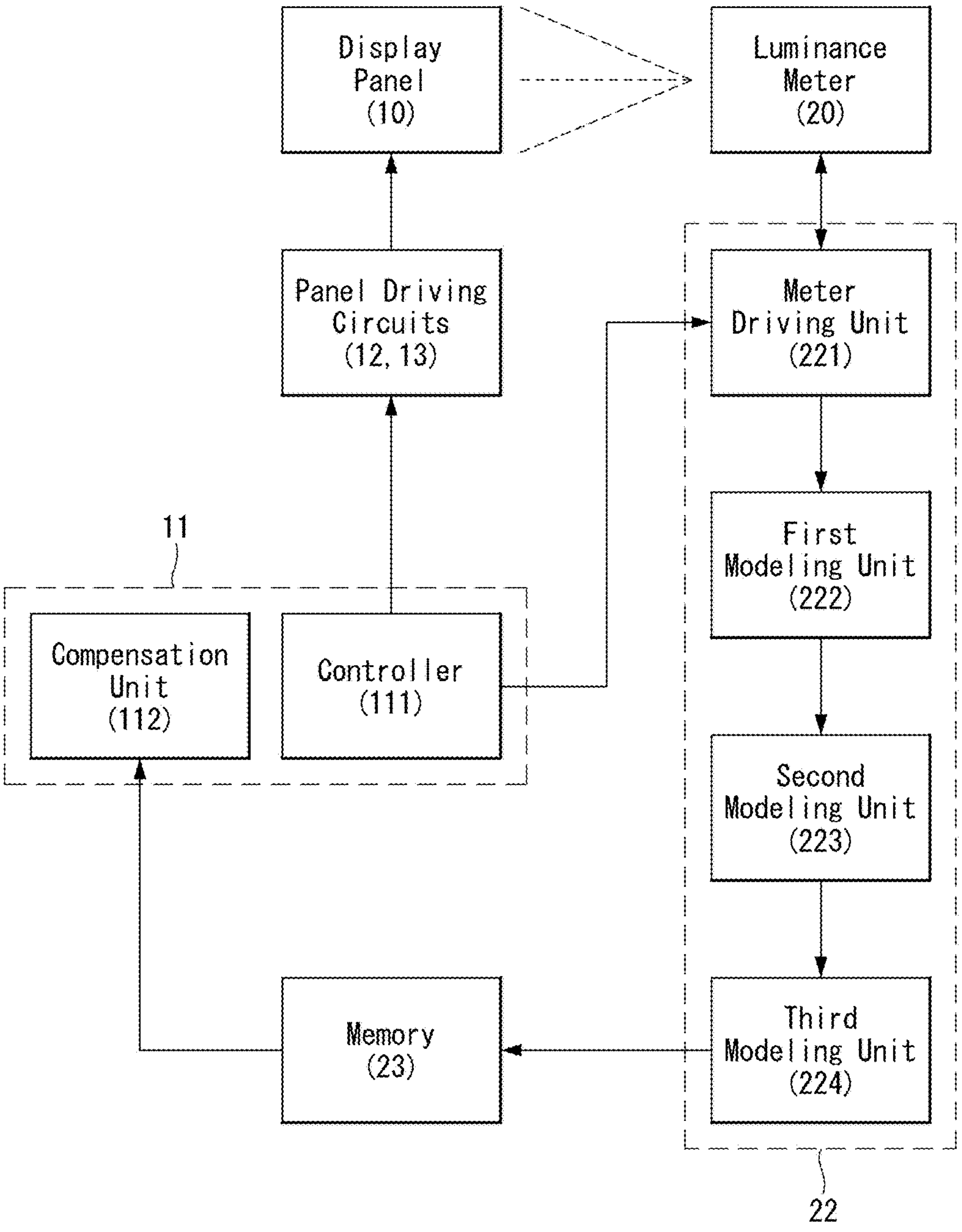
FIG. 4 is a detailed view showing a luminance compensation system of a display device of FIG. 1.
Figure 5:
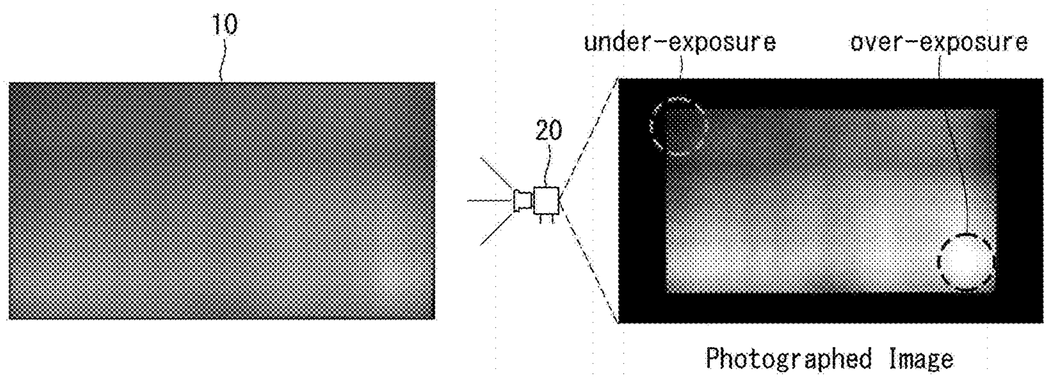
FIG. 5 is a view showing a luminance image photographed after inputting the same data voltage to an entire surface of a display panel in an initial state.
Figure 6:
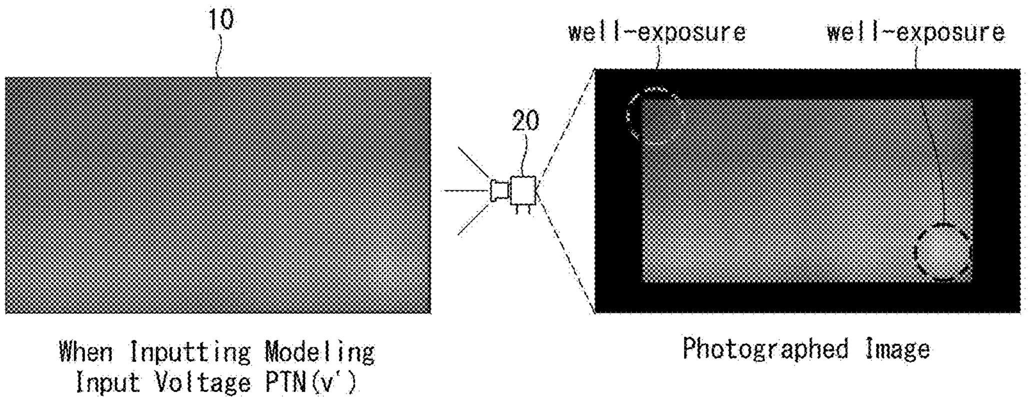
FIG. 6 is a view showing a luminance image photographed after inputting different modeling voltage patterns depending on positions on an entire surface of a display panel in an initial state.
Figure 7:
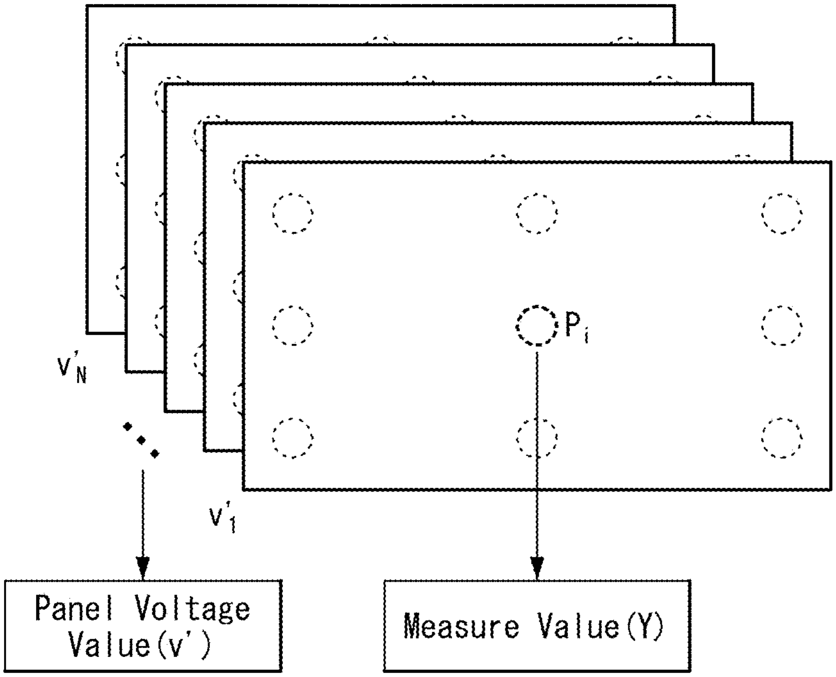
FIG. 7 is a view showing inputting of N modeling voltage patterns to a display panel, and obtaining of measure values by a luminance meter at a plurality of positions.
Figure 8:
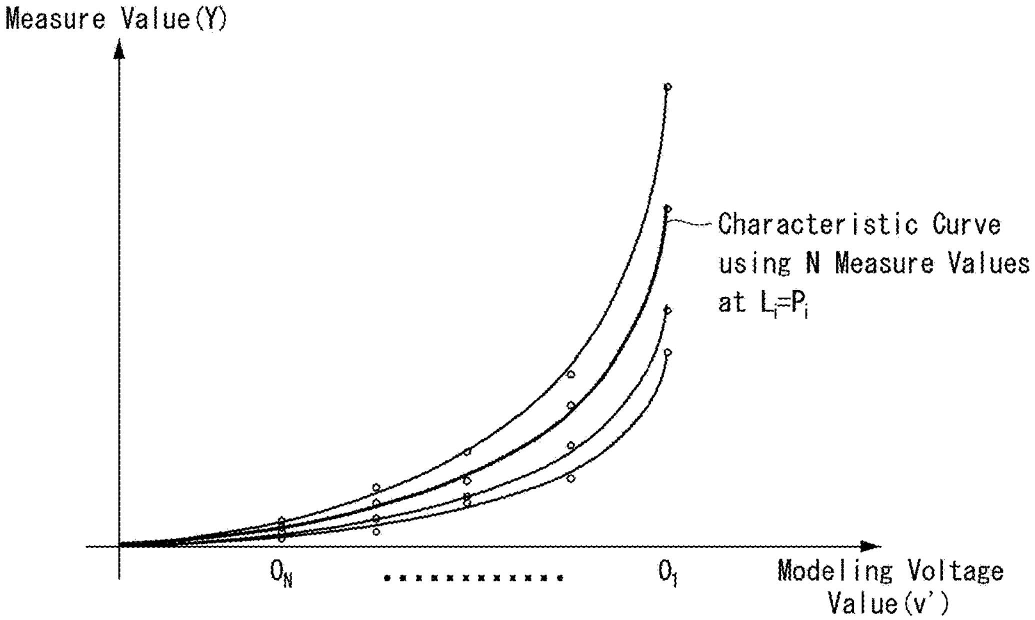
FIG. 8 is a view showing luminance characteristic curves corresponding to each of a plurality of positions and using a plurality of measure values.

FIG. 4 is a detailed view showing a luminance compensation system of a display device of FIG. 1. FIG. 5 is a view showing a luminance image photographed after inputting the same data voltage to an entire surface of a display panel in an initial state. FIG. 6 is a view showing a luminance image photographed after inputting different modeling voltage patterns depending on positions on an entire surface of a display panel in an initial state. FIG. 7 is a view showing inputting of a plurality of modeling voltage patterns to a display panel, and obtaining of measure values by a luminance meter at a plurality of positions. FIG. 8 is a view showing luminance characteristic curves corresponding to each of a plurality of positions and using a plurality of measure values. FIG. 9 is a view for explaining a correction process of a low grayscale offset in low grayscale sampling voltages belonging to a low grayscale section. FIG. 10 is a view showing an offset correction attenuation gain depending on a voltage.

As shown in FIG. 5, in a photographed image by a luminance meter 20 for a display panel 10, there exists an under-exposure region or an over-exposure region due to an initial luminance deviation. The reason why the regions are generated is that the same data voltage is input to all the positions of the display panel in an initial state and the display panel is photographed, which adversely affects accuracy of a luminance-voltage modeling.

In order to eliminate such a problem, as shown in FIG. 6, a luminance compensation system of the present disclosure inputs different modeling voltage patterns v'(x, y) for each position on an entire surface of the display panel 10 in the initial state. The luminance compensation system of the present disclosure, as shown in Equation 1 below, obtains an entire surface luminance deviation (ΔI (x, y)) through the luminance meter 20 in the initial state, multiplies the entire surface luminance deviation (ΔI (x, y)) by an initial gain value k, and obtains optimal modeling voltage patterns (v'(x, y)) for each position.

$$v'(x,y)=v+k\Delta I(x,y) \qquad \text{[Equation 1]}$$

The luminance compensation system of the present disclosure can obtain the modeling voltage patterns (v'(x, y)) that can minimize the initial luminance deviation of (e.g., as displayed on) the entire surface of the display panel by one camera photographing and is effective to reduce compensation time.

Referring to FIG. 4, a luminance-voltage modeling circuit 22 of the present disclosure may include a meter driving circuit 221 (which may be referred to herein as a meter driving unit), a first modeling circuit 222 (which may be referred to herein as a first modeling unit), a second modeling circuit 223 (which may be referred to herein as a second modeling unit), and a third modeling circuit 224 (which may be referred to herein as a third modeling unit). In some embodiments, one or more of the meter driving circuit 221, the first modeling circuit 222, the second modeling circuit 223, and the third modeling circuit 224 may be implemented at least in part as software that is loadable or executable by one or more hardware structures, such as a microcontroller, microprocessor, or the like.

Referring to FIG. 4, the luminance meter 20, as shown in FIG. 7, measures luminance at a plurality of positions Pi in a state where a plurality of modeling voltage patterns v'1 to v'n are applied to each of the plurality of positions Pi of the display panel 10 and obtains a plurality of measure values Y for each of the plurality of positions Pi. Each position of the plurality of positions Pi may correspond to a particular region of the surface of the display panel 10, which may have various sizes in accordance with various embodiments of the present disclosure.

Referring to FIG. 4, the meter driving unit 221 adjusts image acquisition conditions or parameters (e.g., exposure time, etc.) of the luminance meter 20 under control of a controller 111, which may be, for example, a microprocessor or any controller circuitry suitable to control operation of the meter driving unit 221.

Referring to FIG. 4, the first modeling unit 222 models the plurality of measured values Y for each of the plurality of positions Pi to obtain a luminance characteristic curve as shown in FIG. 8. The first modeling unit 222 may generate the luminance characteristic curve based on the measured values Y for each of the plurality of positions Pi using any suitable data fitting technique, including, for example, regression analysis, nonlinear regression, least squares, nonlinear least squares, or the like. This luminance characteristic curve corresponds to each of the plurality of positions Pi and uses the plurality of measured values Y, and can be obtained through a nonlinear fitting method, but the present disclosure is not limited thereto. The first modeling unit 222 obtains compensation parameters (a, b, c) of a luminance characteristic approximate equation ($\widehat{L_i(v')}$) for each of the plurality of positions Pi, as shown in Equation 2 below, based on the luminance characteristic curve. And, the first modeling unit 222 derives a first luminance characteristic approximate equation ($\widehat{L_i(v)}$) for entire grayscales, as shown in Equation 3 below by substituting ($b'_i=b_i+k\Delta I(x,y)$ substituting) a corresponding modeling voltage into the luminance characteristic approximate equation ($\widehat{L_i(v')}$) for each of the plurality of positions Pi.

$$\widehat{L_i(v')}=a_i\times(v'-b_i)^{c_i} \qquad \text{[Equation 2]}$$

luminance characteristic approximate equation at position i (based on v')

$$\widehat{L_i(v)}=a_i\times(v-b'_i)^{c_i} \qquad \text{[Equation 3]}$$

luminance characteristic approximate equation at position i (based on v)

Referring to FIG. 4, the second modeling unit 223 obtains a luminance error between the measured value and a luminance value in accordance with the first luminance characteristic approximate equation (i.e., Equation 3, above) at low grayscale sampling voltages (for example, Q low grayscale voltages) belonging to a low grayscale section, after calculating an offset correction parameter by multiplying the luminance error by a low grayscale correction gain, and then applies the offset correction parameter to the first luminance characteristic approximate equation to derive a second luminance characteristic approximate equation in which a low grayscale offset is corrected.

Figure 9A:
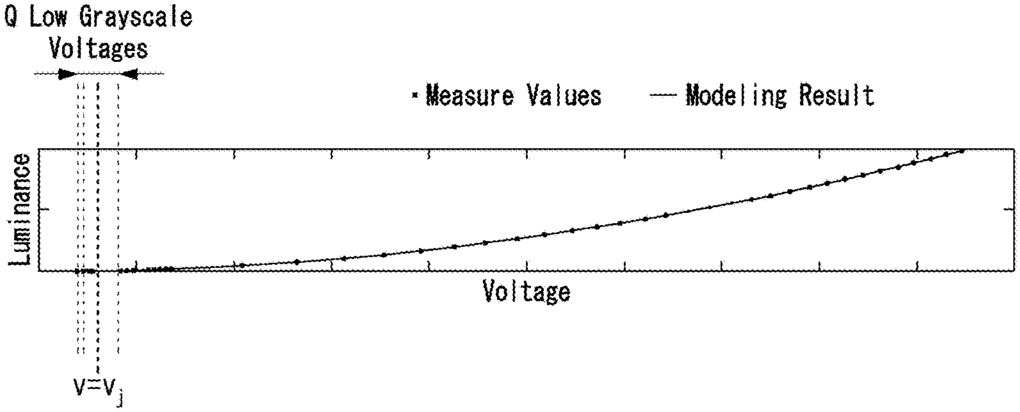
FIGS. 9A-9D are views for explaining a correction process of a low grayscale offset in low grayscale sampling voltages belonging to a low grayscale section.
Figure 9B:
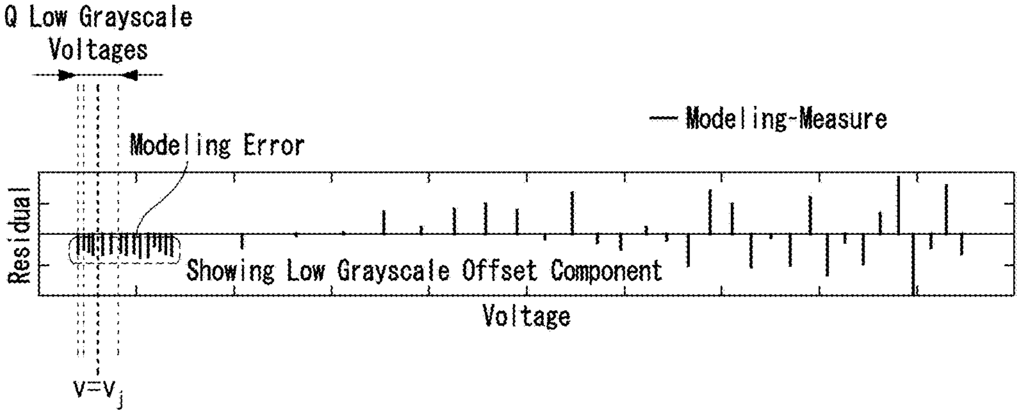
Figure 9C:
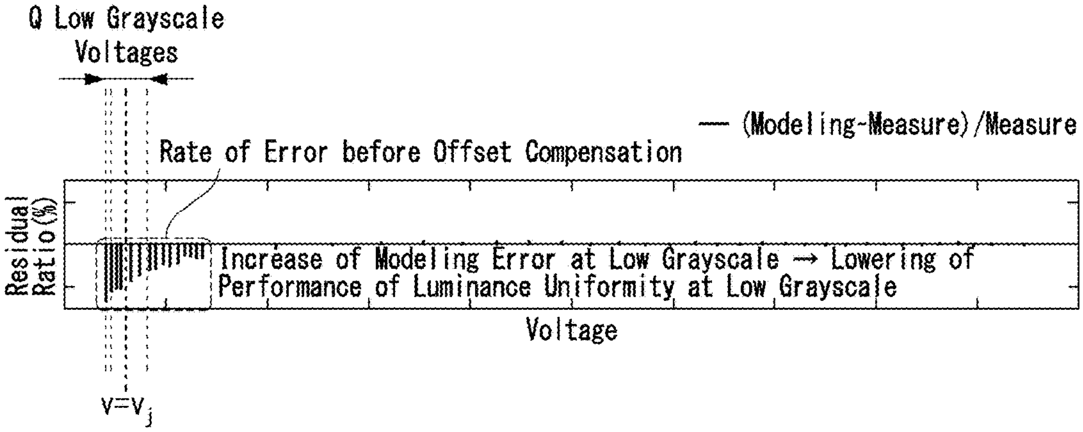
Figure 10:
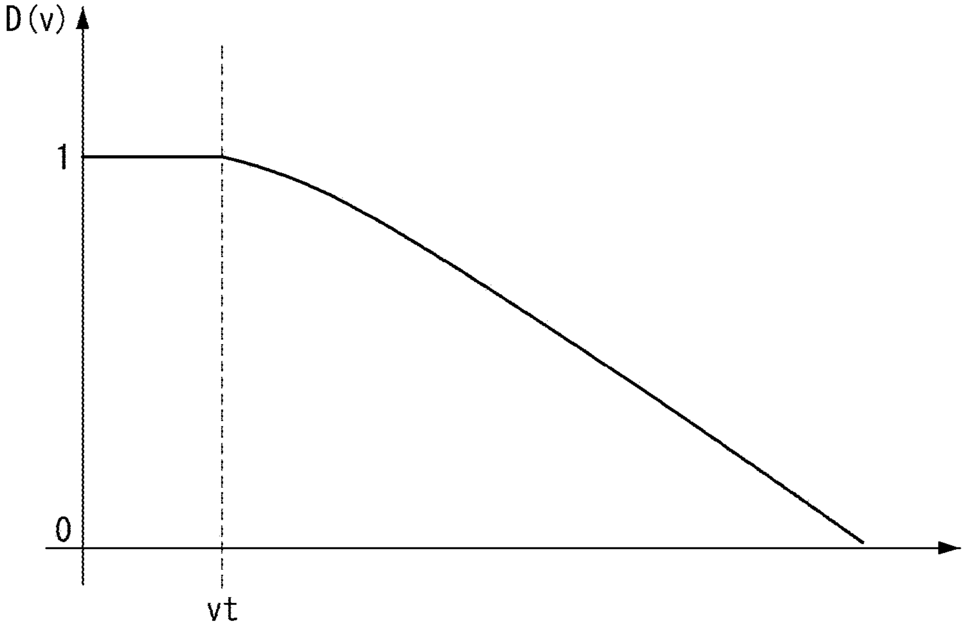
FIG. 10 is a view showing an offset correction attenuation gain depending on a voltage.

Specifically, as shown in FIGS. 9A and 9B, there is an error ($\Delta L_i(v_j)$) between an actual measure value ($L_i(v_j)$) and the luminance value ($\widehat{L_i(v)}$) in accordance with the first luminance characteristic approximate equation at an arbitrary position Pi and voltage vj due to a modeling error. As shown in of FIG. 9C, a rate of this error increases as a grayscale decreases, so that compensation performance of luminance uniformity at a low grayscale is significantly lower than that at a high grayscale.

In order to improve the compensation performance of luminance uniformity at the low grayscale, the second modeling unit 223 obtains a luminance error ($\Delta L_i(v_j)$) at the low grayscale sampling voltages vj belonging to the low grayscale section, as shown in Equation 4 below, and multiplies the luminance error ($\Delta L_i(v_j)$) by the low grayscale correction gain ($G_{v_j}$) to obtain an offset correction parameter ($\Delta b_i(v_j)$). The low grayscale section may be any section or region at the lower end of the grayscale, for example, from 0% to 5%, 0% to 10%, 0% to 15%, and so on.

$$\Delta L_i(v_j)=\widehat{L_i(v_j)}-L_i(v_j)$$

$$\Delta b_i(v_j=G_{v_j}\times\Delta L_i(v_j) \quad \text{[Equation 4]}$$

The second modeling unit 223 estimates the offset correction parameter ($\Delta b_i(v)$) by interpolation, as shown in Equation 5, at remaining voltages v of the low grayscale section excluding the low grayscale sampling voltages v1, . . . , vq, so that it can reduce hardware resources. Various methods such as linear interpolation and nonlinear interpolation can be applied to the interpolation.

$$\Delta b_i(v)=\text{Interp}(\Delta b_i(v_1)\sim\Delta b_i(v_q)) \quad \text{[Equation 5]}$$

Figure 9D:
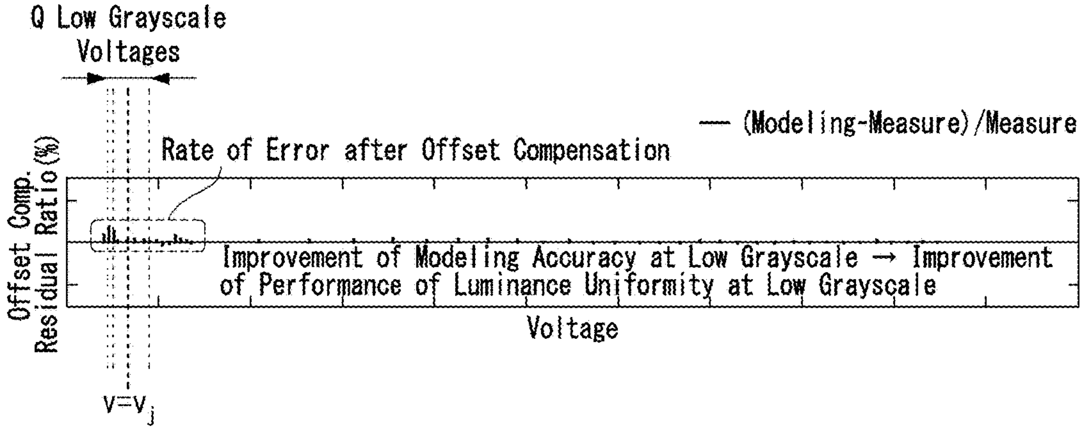

The modeling error in the low grayscale section is drastically reduced by the offset correction parameter as shown in FIG. 9D.

The second modeling unit 223 applies the offset correction parameter to the first luminance characteristic approximate equation to derive the second luminance characteristic approximate equation ($\widehat{L_i(v)}$) in which the low grayscale offset is corrected at the position i as shown in Equation 6.

$$\widehat{L_i(v_j)}=a_i\times(v-b_i+\Delta b_i(v))^{c_i} \quad \text{[Equation 6]}$$

Referring to FIG. 4, the third modeling unit 224 applies an offset correction attenuation gain D(v) as shown in FIG. 10 so that unnecessary offset correction does not occur at the high grayscale. The offset correction attenuation gain D(v) is maintained at "1" in the low grayscale section up to a low grayscale threshold voltage vt and is reduced from "1" to "0" in proportion to a grayscale in a grayscale section greater than the low grayscale threshold voltage vt. That is, the offset correction attenuation gain D(v) is applied with a first gain value (e.g., a gain of "1") over the entire range of the low grayscale section (i.e., for grayscale voltages up to the low grayscale threshold voltage vt), and has a value for grayscales greater than the low grayscale section (i.e., for grayscale voltages greater than the low grayscale threshold voltage vt) that declines from the first gain value to a value of 0 as the grayscale is increased toward the highest grayscale. The offset correction attenuation gain D(v) shown in FIG. 10 may have a substantially constant value up to the low grayscale threshold voltage vt, and a substantially linear declining section thereafter; however, embodiments provided herein are not limited thereto. The decline in the offset correction attenuation gain D(v) may be, for example, a non-linear curve, an exponential, a linear curve having any suitable slope, or any other suitable function.

In other words, the third modeling unit 224 previously sets the offset correction attenuation gain D(v) for reducing an influence of the offset correction parameter in remaining grayscale section other than the low grayscale section, and multiplies the offset correction attenuation gain D(v) by the offset correction parameter of the second luminance characteristic approximate equation to derive a third luminance characteristic approximate equation ($\overline{L_i(v)}$) at the position i as shown in Equation 7 below.

$$\overline{L_i(v)}=a_i\times(v-b_i+D(v)\Delta b_i(v))^{c_i} \quad \text{[Equation 7]}$$

Referring to FIG. 4, the memory 23 stores the compensation parameters (a, b, c), the offset correction parameter ($\Delta b_i(v)$), and the offset correction attenuation gain D(v) calculated in the luminance-voltage modeling circuit 22.

Referring to FIG. 4, a compensation circuit 112 (which may be referred to herein as a compensation unit) applies the information stored in the memory 23 to Equation 8 below to compensate the gate-source voltage Vgs of the driving TFT in an entire grayscale section (e.g., over the entire grayscale range or over all grayscale voltages) for each of the plurality of positions. The compensation circuit 112 may be any suitable compensation circuitry, and in some embodiments, may be implemented at least in part as software that is loadable or executable by one or more hardware structures, such as a microcontroller, microprocessor, or the like.

$$v_{gs}=\{V_{data}\times(a_{ref}/a_i)^{1/c_i}+b_i+D(V_{data})\Delta b_i(V_{data})\}-V_{ref} \quad \text{[Equation 8]}$$

In Equation 8, the term Vdata denotes a data voltage of a digital level. The term Vref denotes a reference voltage of a digital level. The terms ai, bi, and ci denote compensation parameters at position i. The term aref denotes an average value of a compensation parameter (a) at a plurality of positions. The term D(Vdata) denotes the offset correction attenuation gain corresponding to the Vdata. The term Δbi(Vdata) denotes the offset correction parameter corresponding to the Vdata at position i.

Figure 11:
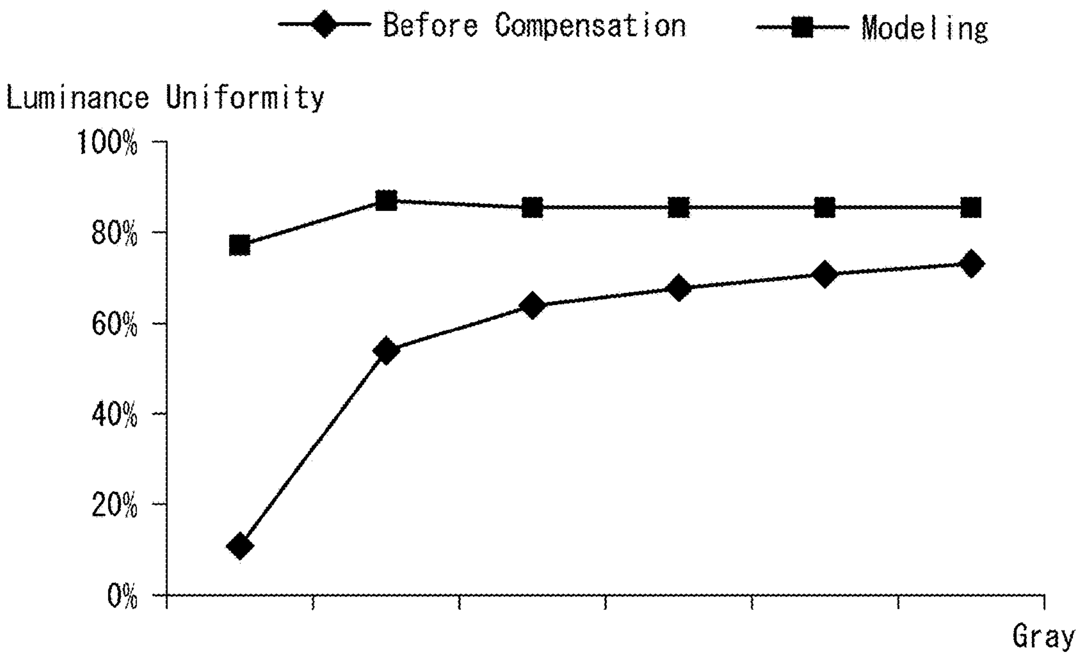
FIGS. 11 and 12 are simulation results showing that luminance uniformity improves over an entire grayscale section after compensating a threshold voltage.
Figure 12:
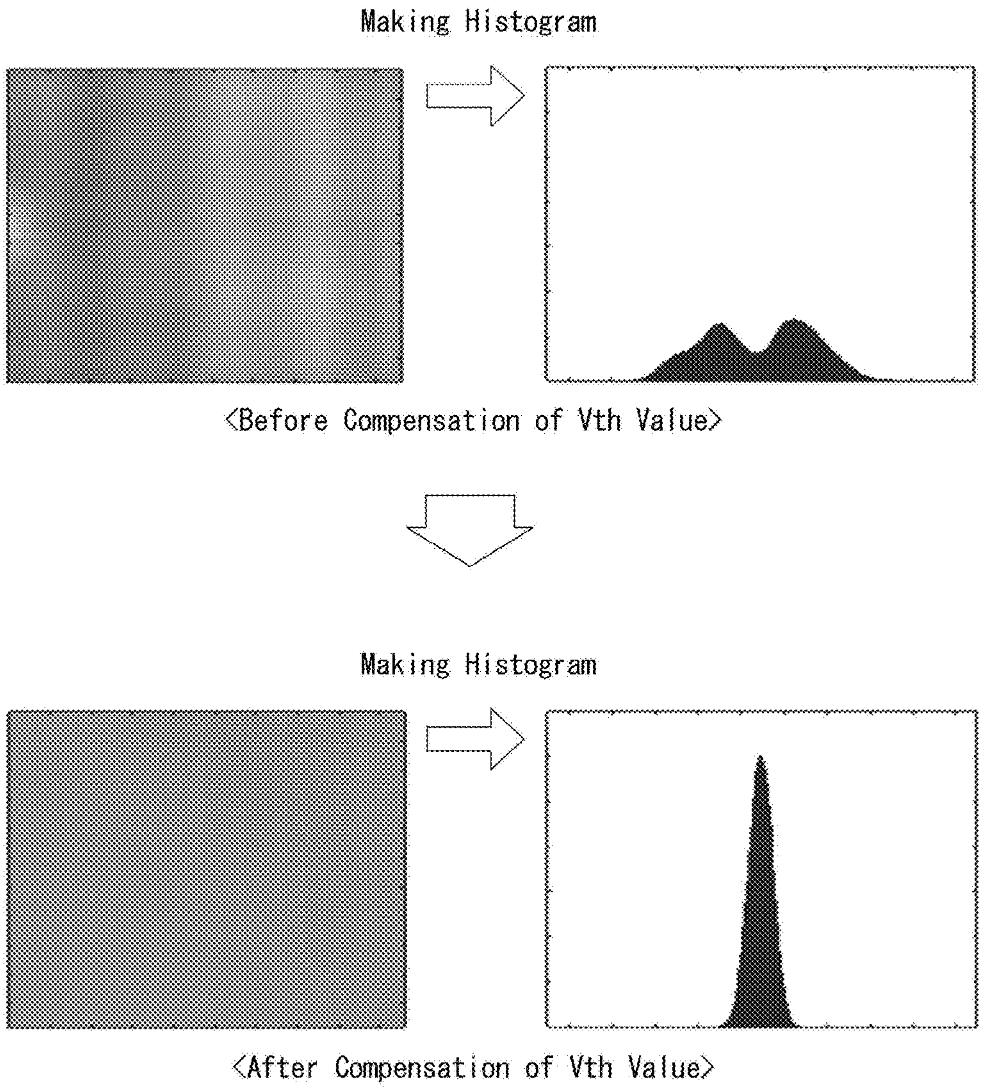

FIGS. 11 and 12 are simulation results showing that luminance uniformity improves over an entire grayscale section after compensating a threshold voltage.

The present disclosure can dramatically increase the luminance uniformity of low grayscale as shown in FIG. 11 without additional photographing. That is, the luminance compensation provided herein can be performed based on a single photograph of the display panel 10, which may be performed, for example, during manufacture, assembly, or testing of the display panel 10. Further, in the present disclosure, as shown in FIG. 12, the distribution of the threshold voltage after modeling is narrower than that before the modeling, and as a result, the luminance uniformity of the entire surface can be greatly increased.

As described above, the present disclosure can greatly increase the luminance uniformity in the low grayscale section without further photographing using a modeling result and an actual luminance deviation of the low grayscale.

Furthermore, the present disclosure can reflect a luminance error compensation value of the low grayscale on only the low grayscale section instead of the entire grayscale, thereby preventing the lowering of the luminance uniformity of the high grayscale and greatly improving the luminance uniformity in the entire grayscale section.

Furthermore, the present disclosure sets modeling voltage patterns to have different values at a plurality of positions so that an initial luminance deviation is minimized, so that it can implement voltage-luminance modeling for a display panel having a large initial luminance deviation.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A luminance compensation system of a display device, comprising:

a display panel including a plurality of pixels, each of the plurality of pixels including a driving thin film transistor (TFT) configured to generate a driving current based on a gate-source voltage and an organic light emitting diode (OLED) configured to emit light based on the driving current;

a luminance meter configured to measure luminance of the display panel at a plurality of positions while a plurality of modeling voltage patterns are applied to the display panel, and to obtain, for each of the plurality of positions, a plurality of measured values;

a first modeling circuit configured to model the plurality of measured values and to derive a first luminance characteristic approximate equation including at least one compensation parameter for an entire grayscale for each of the plurality of positions; and a second modeling circuit configured to:

determine a luminance error between the measured values and approximate luminance values of the first luminance characteristic approximate equation at low grayscale sampling voltages of a low grayscale section, calculate an offset correction parameter by multiplying the determined luminance error by a low grayscale correction gain, and apply the offset correction parameter to the first luminance characteristic approximate equation to derive a second luminance characteristic approximate equation in which a low grayscale offset is corrected.

2. The luminance compensation system of claim 1, further comprising:

a third modeling circuit configured to set an offset correction attenuation gain for reducing an influence of the offset correction parameter in remaining grayscale sections other than the low grayscale section, and to multiply the offset correction attenuation gain by the offset correction parameter of the second luminance characteristic approximate equation to derive a third luminance characteristic approximate equation.

3. The luminance compensation system of claim 2, wherein the offset correction attenuation gain is maintained at a value of one in the low grayscale section and is proportionally reduced from one to zero for grayscales in the remaining grayscale sections other than the low grayscale section.

4. The luminance compensation system of claim 2, further comprising:

a memory configured to store the at least one compensation parameter, the offset correction parameter, and the offset correction attenuation gain.

5. The luminance compensation system of claim 4, further comprising:

a compensation circuit configured to compensate the gate-source voltage of each of the driving TFTs in an entire grayscale section for each of the plurality of positions, the compensated gate-source voltage of the driving TFTs being equal to:

$$v_{gs}=\{V_{data}\times(a_{ref}/a_i)^{1/c_i}+b_i+D(V_{data})\Delta b_i(V_{data})\}-V_{ref},$$

wherein $V_{data}$ is a data voltage of a digital level, $V_{ref}$ is a reference voltage of a digital level, $a_i$, $b_i$, and $c_i$ are the at least one compensation parameters at position i, $a_{ref}$ is an average value of the compensation parameter a at a plurality of positions, $D(V_{data})$ is the offset correction attenuation gain corresponding to $V_{data}$, and $\Delta b_i(V_{data})$ is the offset correction parameter corresponding to $V_{data}$ at position i.

6. The luminance compensation system of claim 1, wherein the modeling voltage patterns have different values at the plurality of positions so that an initial luminance deviation is minimized.

7. The luminance compensation system of claim 1, wherein the second modeling circuit is configured to estimate the offset correction parameter by interpolation at remaining voltages of the low grayscale section excluding the low grayscale sampling voltages.

8. A luminance compensation method of a display device including a display panel including a plurality of pixels, each of the plurality of pixels including a driving thin film transistor (TFT) configured to generate a driving current based on a gate-source voltage and an organic light emitting diode (OLED) configured to emit light based on the driving current, the method comprising:

applying a plurality of modeling voltage patterns to the display panel;

measuring luminance of the display panel at a plurality of positions while the plurality of modeling voltage patterns are applied, and obtaining a plurality of measured values for each of the plurality of positions;

determining a first luminance characteristic approximate equation for an entire grayscale for each of the plurality of positions based on the plurality of measured values for each of the plurality of positions, the first luminance characteristic approximate equation including at least one compensation parameter;

determining a luminance error between the measured values and approximate luminance values of the first luminance characteristic approximate equation at low grayscale sampling voltages of a low grayscale section;

calculating an offset correction parameter by multiplying the determined luminance error by a low grayscale correction gain; and applying the offset correction parameter to the first luminance characteristic approximate equation and determining a second luminance characteristic approximate equation in which a low grayscale offset is corrected.

9. The method of claim 8, further comprising:

setting an offset correction attenuation gain for reducing an influence of the offset correction parameter in remaining grayscale sections other than the low grayscale section; and determining a third luminance characteristic approximate equation by multiplying the offset correction attenuation gain by the offset correction parameter of the second luminance characteristic approximate equation.

10. The method of claim 9, wherein the offset correction attenuation gain is maintained at a value of one in the low grayscale section and is proportionally reduced from one to zero for grayscales in the remaining grayscale sections other than the low grayscale section.

11. The method of claim 9, further comprising:

storing the at least one compensation parameter, the offset correction parameter, and the offset correction attenuation gain in a memory.

12. The method of claim 11, further comprising: compensating the gate-source voltage of the driving TFTs in an entire grayscale section for each of the plurality of positions, the compensated gate-source voltage of the driving TFTs being equal to:

$$v_{gs}=\{V_{data}\times(a_{ref}/a_i)^{1/c_i}+b_i+D(V_{data})\Delta b_i(V_{data})\}-V_{ref},$$

wherein $V_{data}$ is a data voltage of a digital level, $V_{ref}$ is a reference voltage of a digital level, $a_i$, $b_i$, and $c_i$ are the at least one compensation parameters at position i, $a_{ref}$ is an average value of the compensation parameter a at a plurality of positions, $D(V_{data})$ is the offset correction attenuation gain corresponding to $V_{data}$, and $\Delta b_i(V_{data})$ is the offset correction parameter corresponding to $V_{data}$ at position i.

13. The method of claim 8, wherein the modeling voltage patterns have different values at the plurality of positions so that an initial luminance deviation is minimized.

14. The method of claim 8, wherein the calculating the offset correction parameter includes estimating the offset correction parameter by interpolation at remaining voltages of the low grayscale section excluding the low grayscale sampling voltages.

15. A luminance compensation system, comprising:

a luminance meter which, in use, measures a plurality of luminance values at a plurality of positions of a display panel while a plurality of modeling voltage patterns are applied to the display panel;

a first modeling circuit which, in use, determines a plurality of compensation parameters of a first luminance characteristic approximate equation based on the plurality of measured luminance values; and a second modeling circuit which, in use:

determines a luminance error between the measured luminance values and approximate luminance values of the first luminance characteristic approximate equation at low grayscale sampling voltages of a low grayscale section, the low grayscale sampling voltages corresponding to grayscale sampling voltages between zero and a first grayscale threshold voltage;

calculates an offset correction parameter by multiplying the determined luminance error by a low grayscale correction gain; and applies the offset correction parameter to the first luminance characteristic approximate equation to correct a low grayscale offset.

16. The system of claim 15, further comprising:

a third modeling circuit which, in use, sets an offset correction attenuation gain, and multiplies the offset correction attenuation gain by the offset correction parameter.

17. The system of claim 16 wherein the offset correction attenuation gain has a fixed value over the low grayscale section, and has a value for grayscales greater than the low grayscale section that declines from the fixed value to zero.

18. The system of claim 16, further comprising:

a memory that, in use, stores the compensation parameters, the offset correction parameter, and the offset correction attenuation gain.

19. The system of claim 18, further comprising:

the display panel, wherein the display panel includes a plurality of pixels, each of the pixels including a driving thin film transistor (TFT) that, in use, generates a driving current based on a gate-source voltage to drive a light emitting diode; and a compensation circuit which, in use, compensates the gate-source voltage of each of the driving TFTs based on an input data voltage, the plurality of compensation parameters, the offset correction attenuation gain, and the offset correction parameter.

* * * * *